Feb. 3, 1959 G. J. WEBSTER ET AL 2,871,978
APPARATUS FOR FILTERING SOLIDS FROM GASES
Filed Aug. 30, 1956 2 Sheets-Sheet 1

INVENTORS
G. J. WEBSTER
N. R. WILSON

BY Hudson & Young

ATTORNEYS

INVENTORS
G.J. WEBSTER
N.R. WILSON
BY Hudson & Young
ATTORNEYS

United States Patent Office 2,871,978
Patented Feb. 3, 1959

2,871,978
APPARATUS FOR FILTERING SOLIDS FROM GASES

George J. Webster, Bartlesville, Okla., and Newton R. Wilson, Borger, Tex., assignors to Phillips Petroleum Company, a corporation of Delaware Application August 30, 1956, Serial No. 607,000

3 Claims. (Cl. 183—57)

This invention relates to apparatus designed for separating, removing or filtering dust, grit, sand and other heavier-than-air solids from gases. In one aspect, it relates to a gas filtering apparatus having bag-type filter elements. More particularly, it relates to the filtering of carbon black particles from the smoke, or the hot effluent gas suspension of said carbon black particles, coming from a carbon black furnace.

In many industries there exists the problem of removing suspending solids from a stream of gas which is to be vented to the atmosphere. In some instances it is desirable, from an economical standpoint, to recover the solids. In other instances it is desirable, particularly in congested populated areas, to remove the solids from the vented gases to avoid pollution of the atmosphere. Various designs of different types of filtering equipment have been developed and are in use at the present time. One type of filtering apparatus used is that commonly called the "bag filter." The instant invention relates to such a bag filter and will be described and illustrated as applied to the separation of carbon black particles from the hot effluent gas suspension coming from a carbon black furnace. However, it is to be understood that the instant invention is not to be unduly limited to such application since it can be employed in any system where it is desirous to remove heavier-than-air solids from a gas.

While some of the bag filtering apparatus used in the past and at the present time are satisfactory from a number of points, many of them require periodic shutdowns in order that replacement or repair can be made. These shutdowns often result because of the corrosion problems which arise due to the condensation of moisture present in the hot effluent gas suspension. In addition, these prior art bag filters are relatively expensive structures which require much structural steel and large amounts of insulation. Many of them are relatively inefficient in operation because the gas suspension is not evenly distributed in the filtering apparatus or filtered, and the collection of the removed solids is often difficult.

Accordingly, an object of this invention is to provide an improved apparatus for separating, removing, or filtering suspended solids from gases. Another object is to provide an improved bag filter characterized by its relatively low cost of construction, improved filtering of suspended solids from gases, and efficient collection of the filtered solids. A further object is to provide an improved bag filter which is especially adapted for the removal of carbon black particles from the smoke or hot effluent gas suspension coming from a carbon black furnace. A still further object is to provide an improved bag filtering apparatus having a minimum exposed surface area and a minimum of contoured sections. Other objects and advantages of this invention will become apparent to those skilled in the art from the following discussion, appended claims, and drawings in which:

Broadly contemplating, the bag filtering apparatus of our invention comprises a non-cylindrical or polygonal housing divided by a cell plate into a plurality of upper filtering compartments wherein a plurality of bag-type filtering elements are positioned in closely grouped relation and a lower solids collection chamber in which scraping means and collection means are positioned. A central conduit extends down through the center of the housing and the cell plate into said lower collection chamber and is adapted to conduct a gas having solids suspended therein down into said lower collection chamber and up through the bag filtering elements. In addition, means are provided whereby the solids deposited inside the said bag filtering elements may be dislodged and permitted to fall into said lower collection chamber from which the solids are removed.

Figure 1:
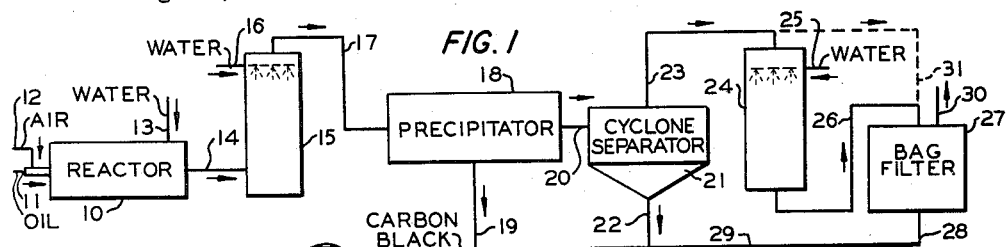
Figure 1 is a schematic flow diagram of a carbon black plant illustrating the applicability of the bag filtering apparatus of our invention.

Referring now to the drawings in which like parts have been designated with like reference numerals, and to Figure 1 in particular, a carbon black reactor 10 is shown to which is fed a stream of oil through line 11 and a stream of air through line 12 in proper proportions. Said oil and air are introduced in a conventional manner so as to heat the vaporized oil under partial combustion conditions and crack the remaining oil to carbon black in conventional manner. As the effluent smoke passes from the outlet end of the reactor 10, said smoke is quenched with a direct stream of water from line 13. Said effluent, quenched to below reaction temperature, generally to a temperature within the range of 1000–1100° F., passes through conduit 14 into secondary quenching chamber 15 wherein it is contacted with a stream of water introduced through line 16 and quenched to a desirable temperature generally within the range of 350–450° F. The resulting quenched effluent is passed via conduit 17 into Cottrell precipitator 18 wherein about 30 percent of the carbon black produced in reactor 10 is recovered and passed into conduit 19. Effluent gases from precipitator 18 is passed via conduit 20 into cyclone separator 21 wherein about 65 percent of the carbon black formed in reactor 10 is recovered and passed into conduit 22. Gaseous effluent from said cyclone separator, which in usual practice contains about 5 percent of the carbon black formed in reactor 10 is passed via conduit 23 into cooling tower 24 wherein said gaseous effluent is contacted with a stream of water introduced through line 25 and the temperature thereof lowered to about 250–260° F. The cooled gases containing suspended carbon black are passed via conduit 26 into the bag filter assembly 27 of our invention (described further hereinafter) and the suspended carbon black is recovered and passed into conduit 28. As the smoke passes through the bag filters in assembly 27 substantially all of the entrained carbon black is recovered and the effluent smoke is vented to the atmosphere through line 30. Recovered carbon black from conduits 19, 22 and 28 is passed into conveyor 29 and conveyed to storage or other processing equipment not shown. Alternately, the gaseous effluent from said cyclone separator can be conducted directly to the bag filter assembly 27 via line 31, by-passing tower 24.

Figure 3:
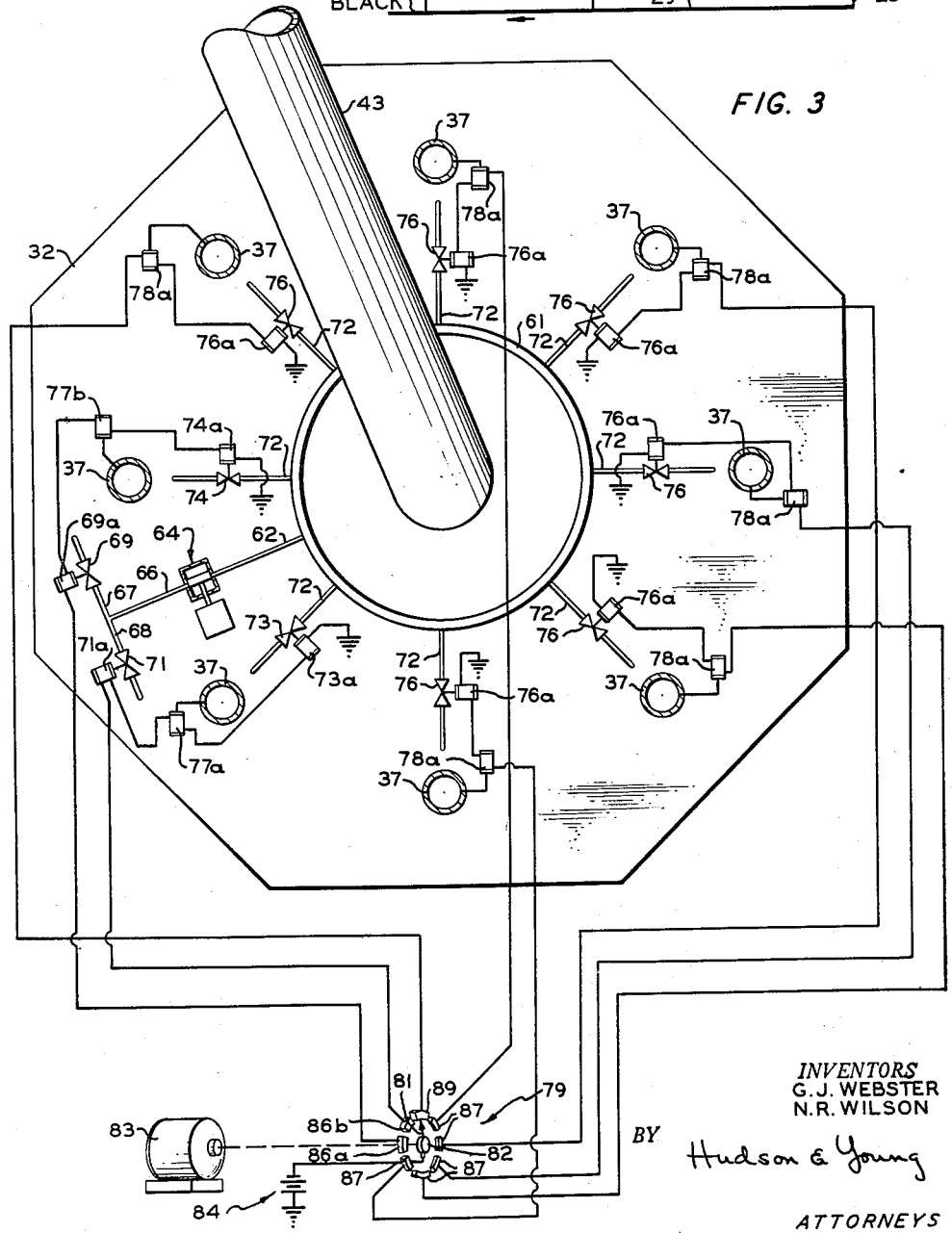
Figure 3 is a top plan view of Figure 2.
Figure 2:
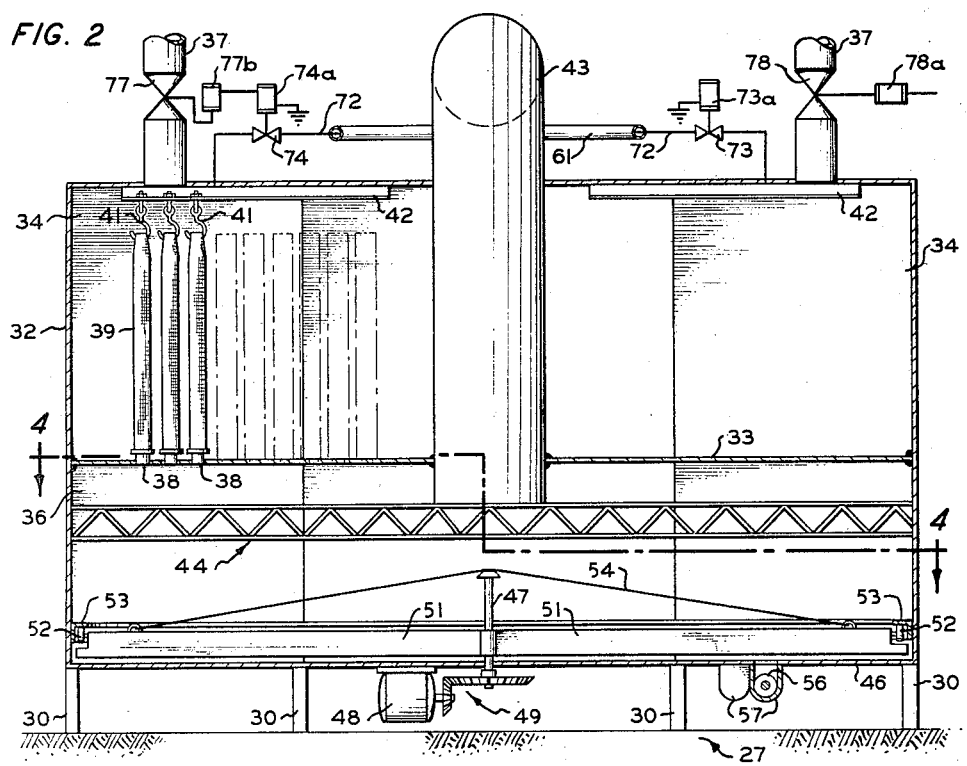
Figure 2 is a view in sectional elevation of a bag filtering apparatus embodying our invention.
Figure 4:
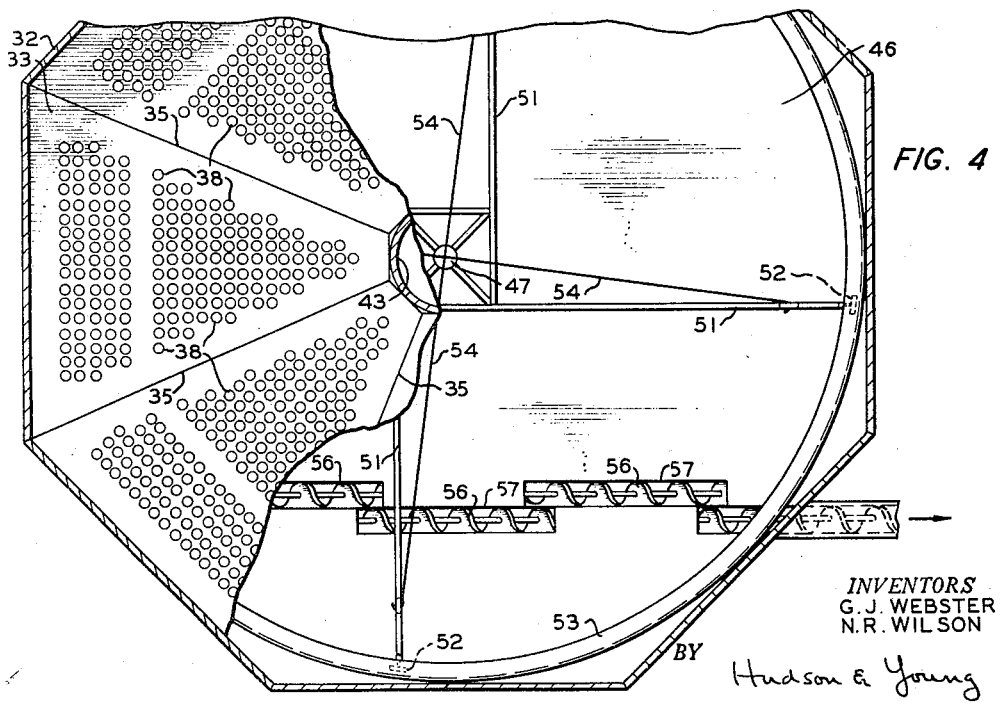
Figure 4 is a cross sectional view of Figure 2 taken along the plane indicated.

In Figures 2, 3 and 4, a bag filter assembly (generally designated 27 in Figure 1) is shown which comprises a vertical housing 32 which has a generally octagon shape and is supported by legs 30. The housing 32 is intermediately divided by a horizontal partition or cell plate 33 into a plurality of upper filtering compartments 34 and a lower solids collection chamber 36. Each of the filtering compartments 34 is provided at its upper end with a solids-free gas outlet conduit 37, and may be equipped with removable and replaceable closures or manholes (not shown) to permit entrance therein for purposes of repair or replacement. The filtering compartments 34 are generally triangular in shape and contiguous at two sides with adjacent filtering compartments. Adjacent compartments 34 have a common side wall 35. The cell plate 33 is provided with a plurality of apertures 38 as shown clearly in Figure 4. Apertures 38 communicate with a plurality of elongated bag-type filtering elements 39. Bag filter elements 39 can be made of any suitable fabric, the particular fabric being employed depending upon the service to which bag filtering apparatus is to be employed. Suitable fabric for this purpose includes that woven from a polyacrylonitrile synthetic fiber available on the open market under the trade-name mark "Orlon." A more preferred fabric is that woven from glass fibers. The filter elements 39 are folded over at their upper ends in the form of a loop through which hooks 41 are inserted. The hooks 41 are secured to and depend from a suitable upper plate 42.

Extending down through the center from the housing 32 is an inlet conduit 43, which has its lower end opening into the lower collection chamber 36. The lower end of conduit 43 is supported by means of a truss support 44 which extends horizontally across collection chamber 36 and is suitably secured to the housing 32. The lower end of chamber 36 is defined by a flat horizontal plate 46. A shaft 47 centrally extends upward into chamber 36 and is adapted to be rotated by means of motor 48 and gears 49 which are positioned beneath plate 46. A plurality of scraper elements 51 are secured at one end to shaft 47 and radiate outward therefrom. Scraper elements 51 are positioned adjacent the upper surface of plate 46 and are provided at their outer extremities with rollers 52 which are adapted to register with a track 53 secured to the surface of housing 32 in chamber 36. Suitable guy wires 54 are provided to support scraper elements 51. Plate 46 is provided with a plurality of adjoining screw conveyors 56 which are positioned in channels 57 extending from the underside of plate 46. Where the gas suspension desired to be filtered is hot and moisture-laden, such as the hot effluent gas suspension from a carbon black reactor, it is preferred to provide insulating material around the conduit 43 as well as the walls of the various filtering compartments 34, etc., in order to prevent condensation of the moisture in the gas suspension. Because of the polygonal shape of the housing, the exposed surface area of the apparatus is kept small which thus minimizes heat losses. Such a bag filtering apparatus is less expensive to construct because of the flat plate which can be used and the absence of contoured sections.

Referring now to Figure 3, a repressurizing system is shown in schematic form. An annular repressurizing gas header 61 is mounted above housing 32 and encircles conduit 43. Header 61 is supplied with compressed solids-free gas by line 62. The latter line is connected to a compressor, generally designated 64, which compresses solids-free gas supplied thereto by lines 66, 67, and 68. Lines 67 and 68, provided with normally open valves 69 and 71 which are adapted to be actuated by solenoids 69a and 71a, respectively, communicate with different adjacent filtering compartments from which repressurizing gas is supplied (these compartments are hereinafter referred to as repressurizing gas source compartments). Header 61 supplies repressurizing gas to each of the filtering compartments 34 by lines 72. Those lines 72 which communicate with the upper portion of those filter compartments functioning as repressurizing gas source compartments are provided with normally closed valves 73 and 74, which valves are adapted to be actuated by solenoids 73a and 74a, respectively. Those lines 72 which communicate with the upper portion of the filtering compartments which do not serve as sources of repressurizing gas are provided with normally closed valves 76, which valves are adapted to be actuated by solenoids 76a. All of the filtering compartments are provided with solids-free outlet conduits or stacks 37. The stacks of those filtering compartments which serve as repressurizing gas source compartments are provided with normally open valves 77, Figure 2, which valves are adapted to be actuated by solenoids 77a and 77b. Similarly, those stacks which communicate with those filtering compartments which do not serve as sources of repressurizing gas are provided with normally open valves 78, Figure 2, which valves are adapted to be actuated by solenoids 78a.

The repressurizing of the individual filtering compartments is synchronized by reason of a time clock generally designated 79. Time clock 79 comprises a rotatable arm 81 which is secured to a shaft 82 which is in turn rotated by motor 83. A source of power, generally designated 84, supplies electrical current to arm 81, and in turn to a plurality of segments 86a, 86b and 87 when any one of the segments is in contact with the arm 81.

As shown in Figure 3, the following electrical circuits actuate the repressurizing system. Solenoids 69a, 77b and 74a are connected in series between segment 86a and ground. Solenoids 71a, 77a and 73a are connected in series between segment 86b and ground. These latter two sets of solenoids actuate the respective aforementioned valves of the two filtering compartments which serve as repressurizing gas source compartments. Each of the filtering compartments which do not serve as sources of repressurizing gas are provided with a set of solenoids which comprise solenoids 76a and 78a, the latter being connected in series between segment 87 and ground. Each of the latter set of solenoids actuate valves 76 and 78. Obviously, the aforementioned sets of solenoids could each be connected in parallel in place of that shown.

In operation, gas containing suspended solids, for example, the smoke from a carbon black furnace, is centrally introduced into the upper portion of the solids collection chamber 36 by conduit 43. The thus introduced smoke flows radially outward in the solids collection chamber 36 and thence upward through apertures 38 in the cell plate 33. The smoke passes upward through the bag-type filtering elements 39 in each of the filtering compartments 34 in such a manner that the solids, for example, carbon black, are deposited on the inside of the filtering elements 39. The solids-free gas passes through the mesh of the filtering elements 39 and flows through the outlet stack 37 of each compartment, the valves in the stacks 37 being normally open. A particular advantage of the bag filtering apparatus of this invention is that the gas suspension which passes to the bag-type filtering elements 39 will have a low amount of solids suspended therein because the gas suspension as it enters the middle of the collection chamber 36 changes direction in passing to the filtering elements 39, thus causing some of the suspended solids to be thrown down into the chamber 36.

In time, that amount of solids deposited inside the bag-type filtering elements 39 which does not fall into the lower solids collection chamber 36 by gravity must be periodically removed by repressurizing in turn each of the individual filtering compartments 34. The repressurizing of the individual filtering compartments 34 is performed in a proper sequence by introducing into each of the filtering compartments 34, at a designated interval, a certain amount of repressurizing gas. When the arm 81 of the time clock 79 comes into contact with a segment, such as a segment 87, the solenoids 78a and 76a are energized whereby the normally open valve 78 in the outlet stack 37 is closed and the normally closed valve 76 is opened. Repressurizing gas, supplied from header 61, is thus introduced via line 72 into a filtering compartment 34. The repressurizing gas flows through the outside wall of the filtering elements 39, thereby dislodging any deposited solids adhering to the inside of the filtering elements 39. This dislodged solids fall through the apertures 38 into the bottom of the collection chamber 36.

Since the valves 69 and 71 in the repressurizing gas source lines 67 and 68 are normally open when filtering compartments other than those filter compartments which serve as sources of repressurizing gas, these valves 69 and 71 are closed when their respective solenoids 69a and 71a are energized upon contact of arm 81 with respective segment 86a or segment 86b. When one of the repressurizing gas source compartments is to be repressurized according to sequence, the valve (69 or 71) in the repressurizing gas source line 67 or 68 of that compartment is closed, as well as the valve (77) in the outlet stack of that compartment; at the same time the valve (73 or 74) in that line (72) supplying repressurizing gas to that compartment is opened. As such, the repressurizing gas header 61 is supplied with repressurizing gas from only one of two repressurizing gas source compartments. For example, when the arm 81 of the time clock 79 comes into contact with segment 86a, solenoids 69a, 77b and 74a are energized, valves 69 and 77 are closed and valve 74 is open.

The repressurizing gas that enters the filtering elements 39 from the outside thereof flows through the apertures 38 in the cell plate 33 and flows into the corresponding apertures of some other filtering compartmentment which at that time is not being repressurized. The solids which collect on the flat bottom of the collection chamber 36 are conveyed to the channels 56 by the revolving scraper elements 51. The solids which fall into the channels 56 are augered or otherwise conveyed from the filtering apparatus.

Various modifications of our invention will become apparent to those skilled in the art without departing from the scope and spirit thereof.

We claim:

1. A dust filtering apparatus comprising, in combination, a polygonal, air-tight housing divided transversely by a horizontal partition into an upper chamber and a lower chamber, said partition having a plurality of apertures, a vertically disposed conduit centrally passing through the top of said housing and said partition, said conduit having an outlet opening at its lower end whereby a gas having suspended dust therein is introduced into substantially the middle of said lower chamber, said upper chamber being subdivided into a plurality of adjacent triangular-shaped filtering compartments which encircle said conduit and are equidistant therefrom, a plurality of parallel spaced, vertically fixed, filter bags suspended in each of said filtering compartments by their closed upper ends, the open lower ends of said filter bags being in sealed communication with said apertures, each of said filtering compartments having an outlet stack for removing dust-free gas from said compartments, said outlet stack having a normally open solenoid actuated valve therein, first conduit means for periodically reintroducing a portion of said dust-free gas into said filtering compartments under pressure whereby dust deposited on the insides of said filter bags is dislodged and permitted to fall through said apertures into said lower chamber, said first conduit means having a normally closed solenoid actuated valve therein, at least two of said filtering compartments serving as sources of dust-free gas for the purpose of repressurizing said filtering compartments, each of the latter filtering compartments having second conduit means communicating with a compressor and a repressurizing gas header, each of said second conduit means having a solenoid actuated valve therein, said first conduit means communicating with said header, means for periodically actuating the said solenoid actuated valves of each filtering compartment according to a predetermined timed sequence whereby said filtering compartments are repressurized with said dust-free gas, revolving scraping means in said lower chamber, and conveying means for removing collected dust from said lower compartment.

2. A dust filtering apparatus comprising, in combination, an air-tight housing divided transversely by a horizontal partition into an upper chamber and a lower chamber, said partition having a plurality of apertures, a vertically disposed conduit centrally passing through the top of said housing and said partition, said conduit having an outlet opening at its lower end whereby a gas having suspended dust therein is introduced into substantially the middle of said lower chamber, said upper chamber being subdivided into a plurality of adjacent filtering compartments, a plurality of parallel spaced, vertically fixed, filter bags suspended in each of said filtering compartments by their closed upper ends, the open lower ends of said filter bags being in sealed communication with said apertures, each of said filtering compartments having an outlet stack for removing solids-free gas from said compartments, said outlet stack having a normally open valve therein, first conduit means for periodically reintroducing a portion of said solids-free gas into said filtering compartments under pressure whereby solids deposited on the insides of said filter bags are dislodged and permitted to fall through said apertures into said lower chamber, said first conduit means having a normally closed valve therein, at least two of said filtering compartments serving as sources of solids-free gas for the purpose of repressurizing said filtering compartments, each of the latter filtering compartments having second conduit means communicating with a compressor and a repressurizing gas header, each of said second conduit means having a valve therein, said first conduit means communicating with said header, and means for periodically actuating said valves of each filtering compartment according to a predetermined timed sequence whereby said filtering compartments are repressurized with said solids-free gas.

3. A filtering apparatus, comprising in combination, an air-tight housing divided into upper and lower chamber means, said upper chamber means being subdivided into a plurality of filtering compartments, a plurality of vertically arranged filtering elements within each of said filtering compartments, the open lower ends of said filtering elements being in sealed communication with said lower chamber means, means for introducing into said lower chamber means a gas having suspended solids therein, each of said filtering compartments having an outlet stack for removing solids-free gas from said filtering compartments, said outlet stack having a normally open valve therein, first conduit means for periodically reintroducing a portion of said solids-free gas into said filtering compartments under pressure whereby solids deposited in said filtering elements are dislodged and fall into said lower chamber means, said first conduit means having a normally closed valve therein, at least two of said filtering compartments serving as sources of solids-free gas for the purpose of repressurizing said filtering compartments, each of the latter filtering compartments having second conduit means communicating with a compressor and a repressurizing gas header, each of said second conduit means having a valve therein, said first conduit means communicating with said header, and means for periodically actuating said valves of each of said filtering compartment according to a predetermined timed sequence whereby said filtering compartments are repressurized with said solids-free gas.

References Cited in the file of this patent

UNITED STATES PATENTS 704,724     Whitney                July 15, 1902

FOREIGN PATENTS 441,252     Germany               Mar. 2, 1927
344,227     Great Britain           Mar. 5, 1931